United States Patent [19]

Kyrtsos et al.

[11] Patent Number: 5,430,654
[45] Date of Patent: Jul. 4, 1995

[54] METHOD AND APPARATUS FOR IMPROVING THE ACCURACY OF POSITION ESTIMATES IN A SATELLITE BASED NAVIGATION SYSTEM

[75] Inventors: Christos T. Kyrtsos, Peoria; Adam Gudat, Edelstein, both of Ill.

[73] Assignee: Caterpillar Inc., Peoria, Ill.

[21] Appl. No.: 984,108

[22] Filed: Dec. 1, 1992

[51] Int. Cl.[6] ............................................. G06F 165/00
[52] U.S. Cl. ................................... 364/449; 364/459; 342/357; 342/457; 342/463
[58] Field of Search ............... 364/443, 449, 455, 459; 73/178 R; 342/357, 358, 450, 451, 457, 463, 465

[56] References Cited

U.S. PATENT DOCUMENTS

| | | | |
|---|---|---|---|
| 4,751,512 | 6/1988 | Longaker | 342/357 |
| 4,894,662 | 1/1990 | Counselman | 342/357 |
| 5,021,792 | 6/1991 | Hwang | 342/357 |
| 5,101,356 | 3/1992 | Timothy et al. | 364/449 |
| 5,119,101 | 6/1992 | Barnard | 342/357 |
| 5,119,102 | 6/1992 | Barnard | 342/357 |
| 5,144,318 | 9/1992 | Kishi | 342/357 |
| 5,148,179 | 9/1992 | Allison | 342/357 |
| 5,155,490 | 10/1992 | Spradley, Jr. et al. | 342/357 |
| 5,248,981 | 9/1993 | Yoshihara et al. | 342/357 |

FOREIGN PATENT DOCUMENTS

0518146 12/1992 European Pat. Off. .

OTHER PUBLICATIONS

Van Graas et al., "Real-Time Attitude And Heading Determination Using GPS", *GPS World*, Mar. 1992, pp. 32-39.

*Primary Examiner*—Gary Chin
*Attorney, Agent, or Firm*—Stern, Kessler, Goldstein & Fox; James R. Yee

[57] ABSTRACT

An apparatus and method are disclosed for determining the position of a vehicle at or near the surface of the Earth using navigation signals from a satellite-based navigation system. Precise position estimates are achieved by reducing effective receiver noise. A plurality of receiver means each compute a pseudorange for each satellite. A signal optimizer then uses the pseudoranges from each receiver means to compute an optimal pseudorange for each satellite. A processor means computes a vehicle position from the optimal pseudoranges.

7 Claims, 9 Drawing Sheets

METHOD AND APPARATUS FOR IMPROVING THE ACCURACY OF POSITION ESTIMATES IN A SATELLITE BASED NAVIGATION SYSTEM

FIELD OF THE INVENTION

This invention relates generally to the field of navigation systems which use a constellation of Earth-orbiting satellites to determine the position of a receiver at or near the Earth's surface. More specifically, the invention relates to a method and apparatus for improving the accuracy of position ,estimates by reducing the effective receiver noise.

BACKGROUND OF THE INVENTION

Several national governments, including the United States (U.S.) of America, are presently developing a terrestrial position determination system, referred to generically as a global positioning system (GPS). A GPS is a satellite-based radio-navigation system which is intended to provide highly accurate three-dimensional position information to receivers at or near the surface of the Earth.

The U.S. government has designated its GPS the "NAVSTAR." The NAVSTAR GPS is expected to be declared fully operational by the U.S. government in 1993. The government of the former Union of Soviet Socialist Republics (U.S.S.R.) is engaged in the development of a GPS known as "GLONASS". Further, two European systems known as "NAVSAT" and "GRANAS" are also under development. For ease of discussion, the following disclosure focuses specifically on the NAVSTAR GPS. The invention, however, has equal applicability to other global positioning systems.

In the NAVSTAR GPS, it is envisioned that four orbiting GPS satellites will exist in each of six separate circular orbits to yield a total of twenty-four GPS satellites. Of these, twenty-one will be operational and three will serve as spares. The satellite orbits will be neither polar nor equatorial but will lie in mutually orthogonal inclined planes.

Each GPS satellite will orbit the Earth approximately once every 12 hours. This coupled with the fact that the Earth rotates on its axis once every twenty-four hours causes each satellite to complete exactly two orbits while the Earth turns one revolution.

The position of each satellite at any given time will be precisely known and will be continuously transmitted to the Earth. This position information, which indicates the position of the satellite in space with respect to time (GPS time), is known as ephemeris data.

In addition to the ephemeris data, the navigation signal transmitted by each satellite includes a precise time at which the signal was transmitted. The distance or range from a receiver to each satellite may be determined using this time of transmission which is included in each navigation signal. By noting the time at which the signal was received at the receiver, a propagation time delay can be calculated. This time delay when multiplied by the speed of propagation of the signal will yield a "pseudorange" from the transmitting satellite to the receiver.

The range is called a "pseudorange" because the receiver clock may not be precisely synchronized to GPS time and because propagation through the atmosphere introduces delays into the navigation signal propagation times. These result, respectively, in a clock bias (error) and an atmospheric bias (error). Clock biases may be as large as several milliseconds.

Using these two pieces of information (the ephemeris data and the pseudorange) from at least three satellites, the position of a receiver with respect to the center of the Earth can be determined using passive triangulation techniques.

Triangulation involves three steps. First, the position of at least three satellites in "view" of the receiver must be determined. Second, the distance from the receiver to each satellite must be determined. Finally, the information from the first two steps is used to geometrically determine the position of the receiver with respect to the center of the Earth.

Triangulation, using at least three of the orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate.

Conventionally, four GPS satellites are sampled to determine each terrestrial position estimate. Three of the satellites are used for triangulation, and a fourth is added to correct for the clock bias described above. If the receiver's clock were precisely synchronized with that of the GPS satellites, then this fourth satellite would not be necessary. However, precise (e.g., atomic) clocks are expensive and are, therefore, not suitable for all applications.

For a more derailed discussion on the NAVSTAR GPS, see Parkinson, Bradford W. and Gilbert, Stephen W., "NAVSTAR: Global Positioning System—Ten Years Later," *Proceedings of the IEEE*, Vol. 71, No. 10, October 1983; and GPS: *A Guide to the Next Utility*, published by Trimble Navigation Ltd., Sunnyvale, Calif., 1989, pp. 1–47, both of which are incorporated herein by reference. For a derailed discussion of a vehicle positioning/navigation system which uses the NAVSTAR GPS, see commonly owned U.S. patent application Ser. No. 07/628,560, entitled "Vehicle; Position Determination System and Method," filed Dec. 3, 1990, which is incorporated herein by reference.

In the NAVSTAR GPS, the electromagnetic signals from each satellite are continuously transmitted using a single carrier frequency. Each satellite, however, uses a different modulation gold code to allow differentiation of the signals. The carrier frequency is modulated using a pseudorandom signal which is unique to each GPS satellite. Consequently, the orbiting GPS satellites can be identified when the navigation signals are demodulated.

Furthermore, the NAVSTAR GPS envisions two modes of modulation for the carrier wave using pseudorandom signals. In the first mode, the carrier is modulated by a "C/A signal" and is referred to as the "Coarse/Acquisition mode". The Coarse/Acquisition or C/A mode is also known as the "Standard Positioning Service". The C/A signal is a gold code sequence having a chip rate of 1.023 MHz. Gold code sequences are known in the art.

A chip is one individual pulse of the pseudorandom code. The chip rate of a pseudorandom code sequence is the rate at which the chips in the sequence are generated. Consequently, the chip rate is equal to the code repetition rate divided by the number of members in the code. With respect to the C/A mode of the NAVSTAR GPS, there exists 1,023 chips in each gold code sequence and the sequence is repeated once every millisecond. Use of the 1.023 MHz gold code sequence from four orbiting GPS satellites enables the terrestrial position of an Earth receiver to be determined to an approximate accuracy of within 60 to 100 meters (with 95% confidence).

The second mode of modulation in the NAVSTAR GPS is commonly referred to as the "precise" or "protected" (P) mode. In the P-mode, the pseudorandom code has a chip rate of 10.23 MHz. Moreover, the P-mode sequences are extremely long, so that the sequences repeat no more than once every 267 days. As a result, the terrestrial position of any Earth receiver can be determined to within an approximate accuracy of 16 meters (spherical error probable). The P-mode is also known as the "Precise Positioning Service".

The P-mode sequences are held in secrecy by the United States government and are not made publicly available. The P-mode is intended for use only by Earth receivers specifically authorized by the United States government. Thus, the P-mode modulated data is generally not available so that many GPS users must rely solely on the GPS data provided via the C/A mode of modulation. This relegates most users to a less accurate positioning system.

The clock and atmospheric errors discussed above add to the inaccuracy of the positioning system. Other errors which affect GPS position computations include receiver noise, signal reflections, shading, and satellite path shifting (e.g., satellite wobble). These errors result in computation of incorrect pseudoranges and incorrect satellite positions. Incorrect pseudoranges and incorrect satellite positions, in turn, lead to a reduction in the precision of the position estimates computed by a vehicle positioning system. A differential system will compensate for many of these errors. However, a residual inaccuracy will still be present.

It is desirable to compute a vehicle position to within one meter of accuracy. However, this accuracy has not been possible with conventional systems (using C/A code) because (in part) of the noise threshold of available receivers. The present invention seeks to overcome this limitation and to provide a navigation system with greater positioning accuracy.

SUMMARY OF THE INVENTION

The invention is a method and apparatus for improving the accuracy of position estimates in a satellite based vehicle navigation system. In a first embodiment, a plurality of receivers are provided to receive the navigation signals from each satellite. Based on the navigation signals, each receiver computes a pseudorange to each satellite. For each satellite, the pseudoranges from the plurality of receivers are used to produce an optimal pseudorange. In the preferred embodiment, the optimal pseudorange is an average of the pseudoranges from the plurality of receivers. The optimal pseudorange is used to compute the position estimate for the vehicle.

Computing an optimal pseudorange in this manner results in a reduction in the receiver noise which tends to corrupt the vehicle position computations. The greater the number of receivers which are use, d to produce the optimal pseudorange, the greater is the reduction in receiver noise.

The method of the invention for computing a vehicle position estimate using a satellite based navigation system involves the following steps:

(1) receiving satellite navigation signals from a plurality of satellites at a plurality of receivers;

(2) computing, for each receiver, a pseudorange between the receiver and each satellite from-the navigation signals;

(3) computing, for each satellite, an optimal pseudorange by averaging pseudoranges from each receiver;

(4) computing a satellite position for each satellite; and (5) computing the position of the vehicle using the satellite positions and the optimal pseudoranges for each satellite.

An advantage of the invention is that position errors caused by antenna noise, receiver noise, and other zero mean, random distortions (which are introduced at the front-end of the navigation system) are reduced.

An additional advantage of the invention is that position errors caused by localized reflections may be reduced.

In an alternate embodiment of the invention, a single receiver is used in conjunction with a plurality of antennas. Each antenna receives navigation signals from the satellites. The receiver performs the pseudorange computations for each antenna in a time-multiplexed fashion. An averager circuit then computes an average pseudorange for each satellite. This embodiment results in decreased antenna and other noises, but will not reduce receiver noise.

DESCRIPTION OF THE PREFERRED EMBODIMENT

The present invention is now described with reference to the figures where like reference numbers denote like elements/steps.

Figure 1:
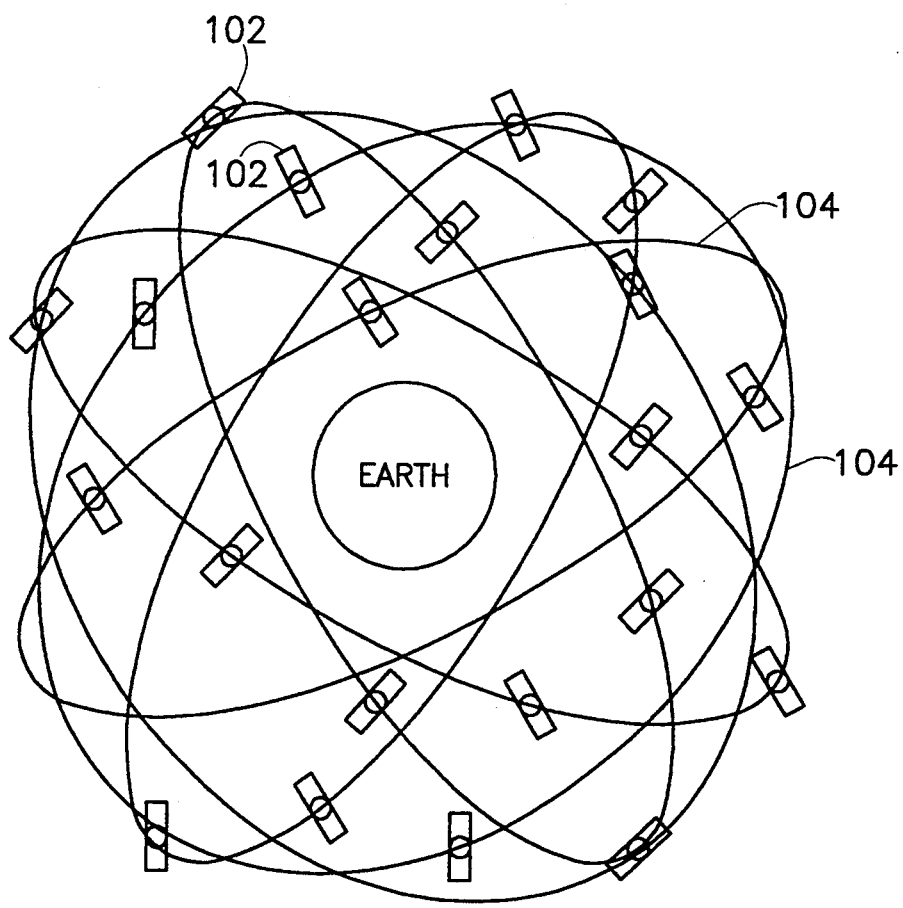
FIG. 1 is a diagram depicting the NAVSTAR GPS satellites in their respective orbits around the Earth.

The invention is a method and apparatus for improving the accuracy of vehicle position estimates in a satellite based navigation system. In the preferred embodiment, the NAVSTAR Global Positioning System (GPS) is used. As discussed above and illustrated in FIG. 1, the NAVSTAR GPS includes twenty-one operational satellites 102 which orbit the Earth in six orbits 104.

Figure 2:
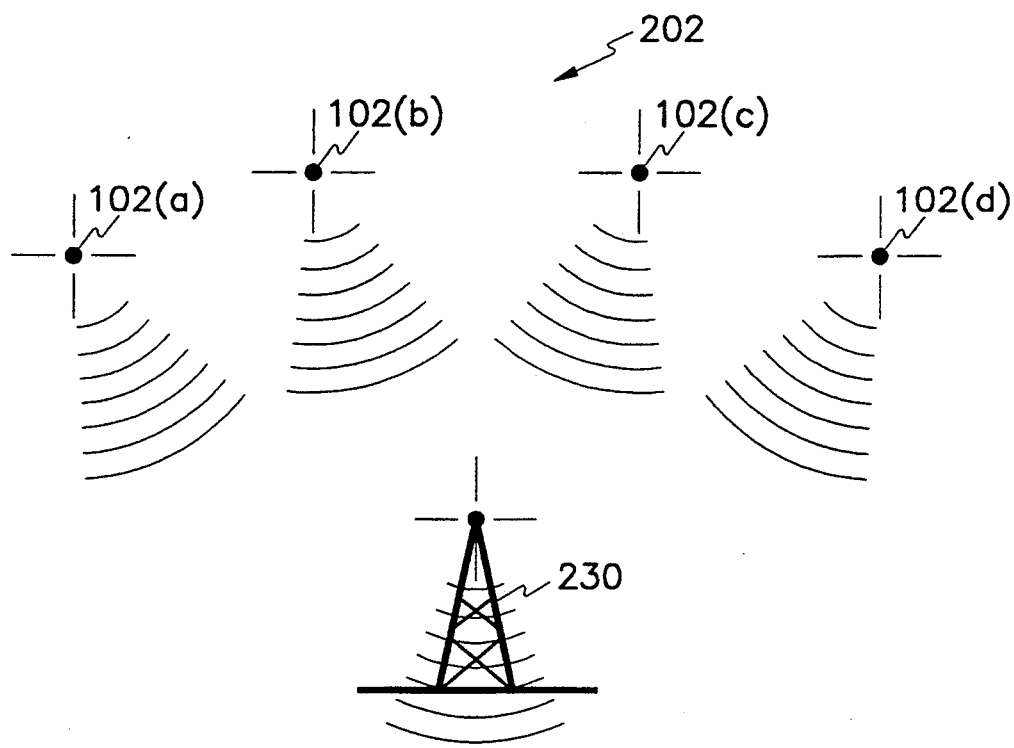
FIG. 2 is a diagram illustrating an autonomous vehicle system which includes a constellation of four GPS satellites, a pseudolite, a base station, and an autonomous vehicle.
Figure 2:
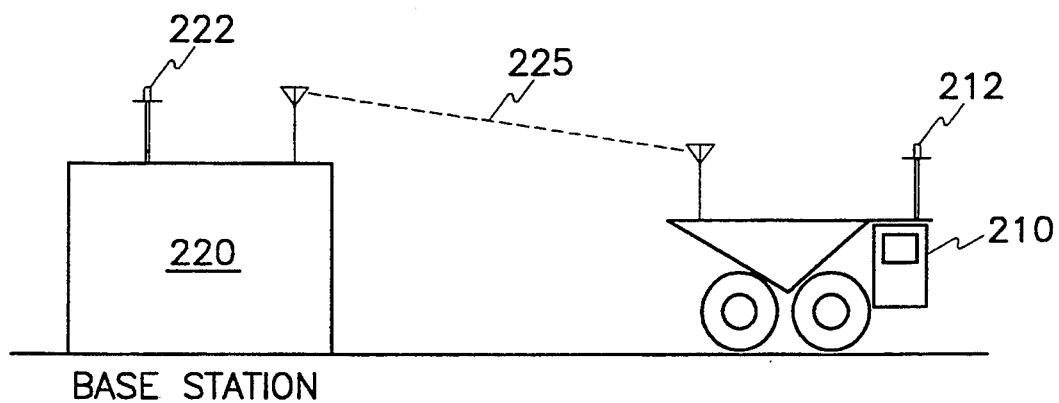

The invention is described in the environment of an autonomous vehicle system 200 as shown in FIG. 2. A representative GPS constellation 202 includes four GPS satellites 102(a)–102(d) for transmitting GPS data. A vehicle (e.g., an autonomous mining truck) 210 and a base station 220 are adapted to receive the GPS data/navigation signals from each GPS satellite 102 in the constellation using respective GPS antennas 212 and 222.

A GPS receiver can receive GPS navigation signals from a satellite which is "in view" of the receiver (i.e., line of sight communications). For example, "in view" may be defined as any satellite that is at least ten degrees up from the horizon. The ten degree angle provides a buffer zone between a useful, in view satellite and a satellite which is just passing out of view below the horizon.

A "constellation" is a group of satellites selected from the satellites "in view" of a GPS receiver. For example, four satellites may be selected from a group of six which are in view of a GPS receiver. The four satellites are normally selected because of a favorable geometry for triangulation (discussed below).

Base station 220 includes a GPS receiver (i.e., a reference receiver) which is located at a known, fixed position. Base station 220 communicates with vehicle 210 over communications channel 225.

Communication channel 225 represents the communications link between base station 220 and vehicle 210. In the preferred embodiment, communication channel 225 comprises radio transceivers. Communication channel 225 is used to transfer data between base station 220 and vehicle 210.

System 200 may optionally include one or more pseudolites 230. A "pseudolite" is a transmitting system located on or near the Earth's surface which emulates a GPS satellite. Because a pseudolite has a fixed, known position, it can greatly enhance the position estimates derived from GPS. For ease of discussion herein, only GPS satellites 102 will be referenced. It should be understood, however, that where position data from a satellite is required, pseudolite data may be substituted.

Figure 3:
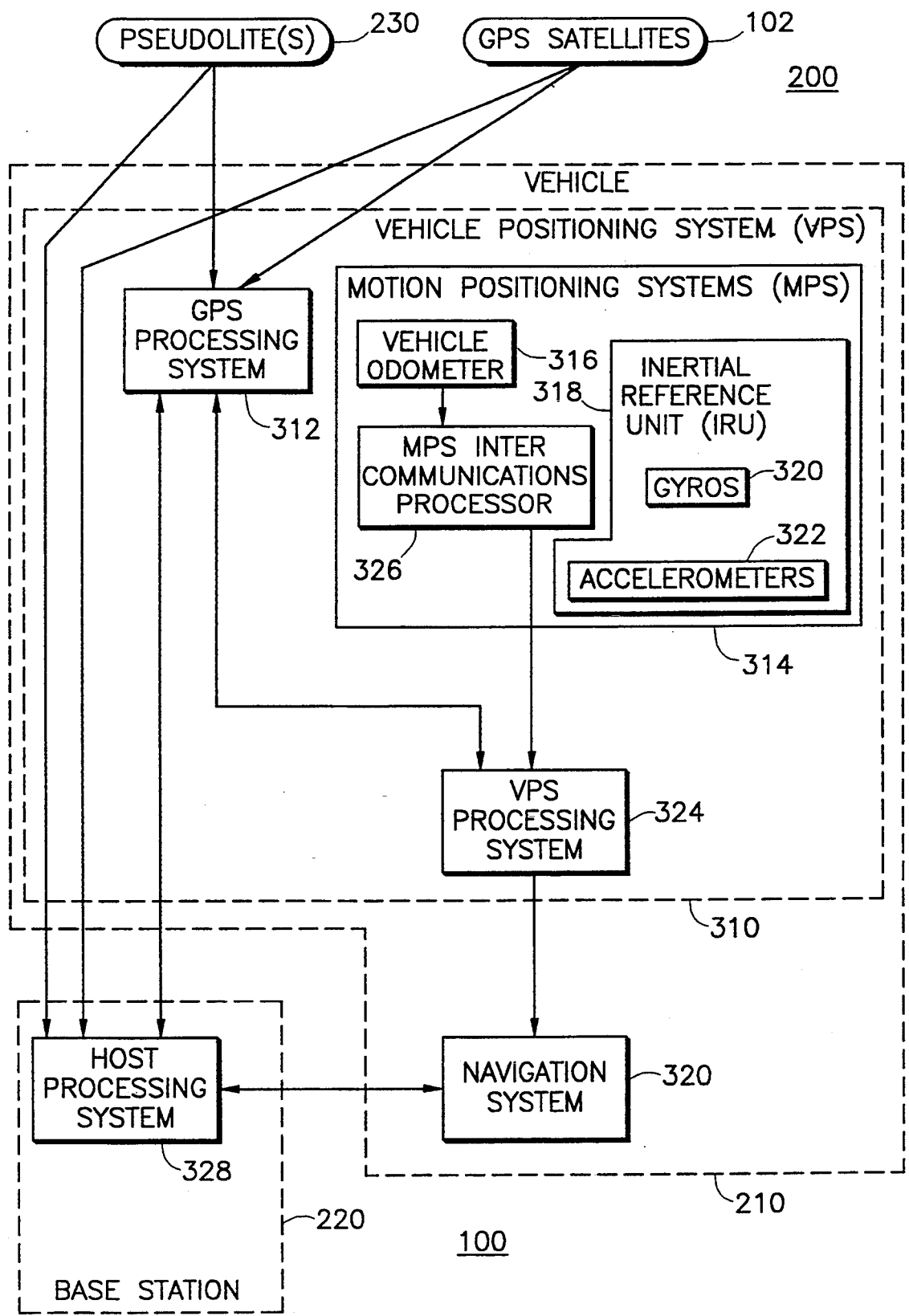
FIG. 3 is a block diagram of the autonomous vehicle system detailing the vehicle positioning system of the autonomous vehicle.

FIG. 3 shows a high-level block diagram of system 200 of the invention, including GPS satellites 102, vehicle 210, base station 220, and pseudolites 230. Vehicle 210 includes a vehicle positioning system (VPS) 310 and a navigation system 320.

Vehicle Positioning System (VPS) 310

The task of guiding vehicle 210 along a prescribed path requires, among other things, an accurate estimate of the vehicle's current position relative to some reference point. Once the current position is known, vehicle 310 can be commanded to proceed to its next destination. VPS 310 allows position estimates of vehicle 210 to be determined with extreme precision.

VPS 310 includes a GPS-processing system 312 and a motion positioning system (MPS) 314. GPS processing system 312 receives GPS dam, i.e., navigation signals, from GPS satellites 102 and computes a first position estimate (FPE) for vehicle 210 therefrom. MPS 314 includes a vehicle odometer 316 and an inertial reference unit (IRU) 318 which track the position of the vehicle based on changes from an initial known position. MPS 314 produces (the actual computations are done in VPS processing system 324) a second position estimate for vehicle 210. The first position estimate and the second position estimate are independently derived.

The first position estimate (from GPS) may be used as an independent indication of the position of vehicle 210. Similarly, the second position estimate (from MPS) may be used as an independent indication of the position of vehicle 210. In the preferred embodiment, however, the first and second position estimates are combined by a VPS processing system 324 (as discussed below) to produce a more accurate third or best position estimate.

Navigation System 320

Navigation system 320 receives the third position estimate from VPS 314. Navigation system 320 uses this precise, third position estimate to accurately navigate vehicle 210.

GPS Processing System 312

Figure 4:
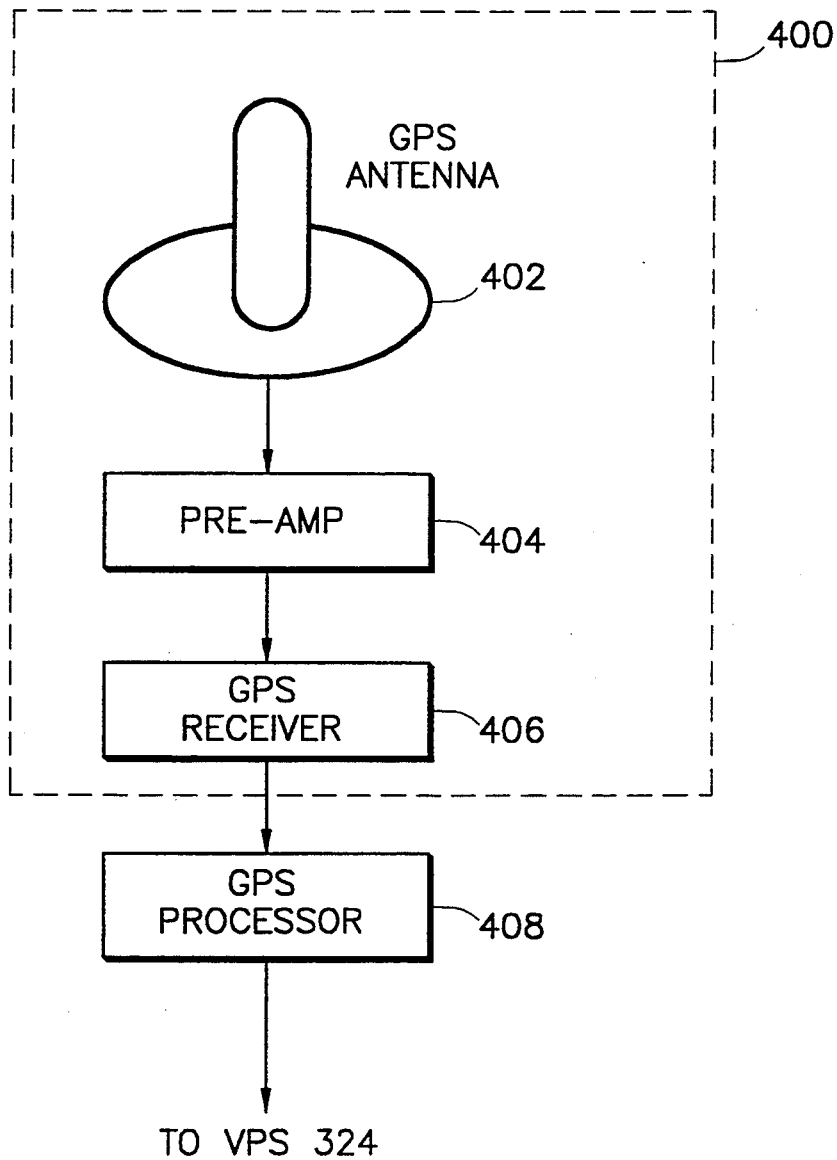
FIG. 4 is a block diagram of a GPS processing system.

GPS processing system 312 is the heart of system 200. With reference to FIG. 4, GPS processing system 3 12 includes a receiver system 400 and a GPS processor 408. Receiver system 400 receives and decodes the navigation signals from the satellites. GPS processor 408 then uses the information from receiver system 400 to compute the first position estimate.

Receiver system 400 includes a GPS antenna 402, a preamplifier 404, and a GPS receiver 406. Antenna 402 is adapted to receive electromagnetic radiation in the radio portion of the spectrum. Preamplifier 404 amplifies a GPS navigation signal received by GPS antenna 402 from a selected GPS satellite. GPS receiver 406 is a multi-channel receiver which decodes the GPS navigation signals and produces a pseudorange and a satellite position for each selected satellite. GPS processor 408 uses the pseudoranges and satellite positions for a plurality of satellites to calculate the first position estimate for vehicle 210.

In the preferred embodiment, antenna 402 and preamplifier 404 are integrated into a single unit. The combined antenna/preamplifier 402/404 and receiver 406 are available together under part number MX4200 from Magnavox Advanced Products and Systems Co., Torrence, Calif. GPS processor 408 includes an MC68020 microprocessor, available from Motorola, Inc., of Schaumburg, Ill.

Receiver 406 computes a pseudoranges for each satellite as follows. As described above, each signal transmitted by a GPS satellite is continuously encoded with the exact time at which the signal was transmitted. By noting the time at which the signal was received at receiver 406, a propagation time delay can be computed. This time delay when multiplied by the speed of propagation of the signal ($2.9979245998 \times 10^8$ m/s) will yield the pseudorange from the transmitting satellite to the receiver. As discussed above, the range is called a "pseudorange" because the receiver clock is not precisely synchronized to GPS time (causing a clock error) and because propagation through the different layers of the-atmosphere changes the speed of the propagating signals (causing an atmospheric error).

GPS receiver 406 may use an almanac to roughly determine the position of a satellite (e.g., for acquisition purposes). For a more precise determination of satellite position, the receiver decodes the GPS navigation signal and extracts ephemeris data therefrom. The ephemeris data indicates the precise position of the transmitting satellite.

GPS processor 408 calculates the first position estimate using the pseudoranges and satellite positions from GPS receiver 406. This is described below with reference to FIG. 5.

Figure 5:
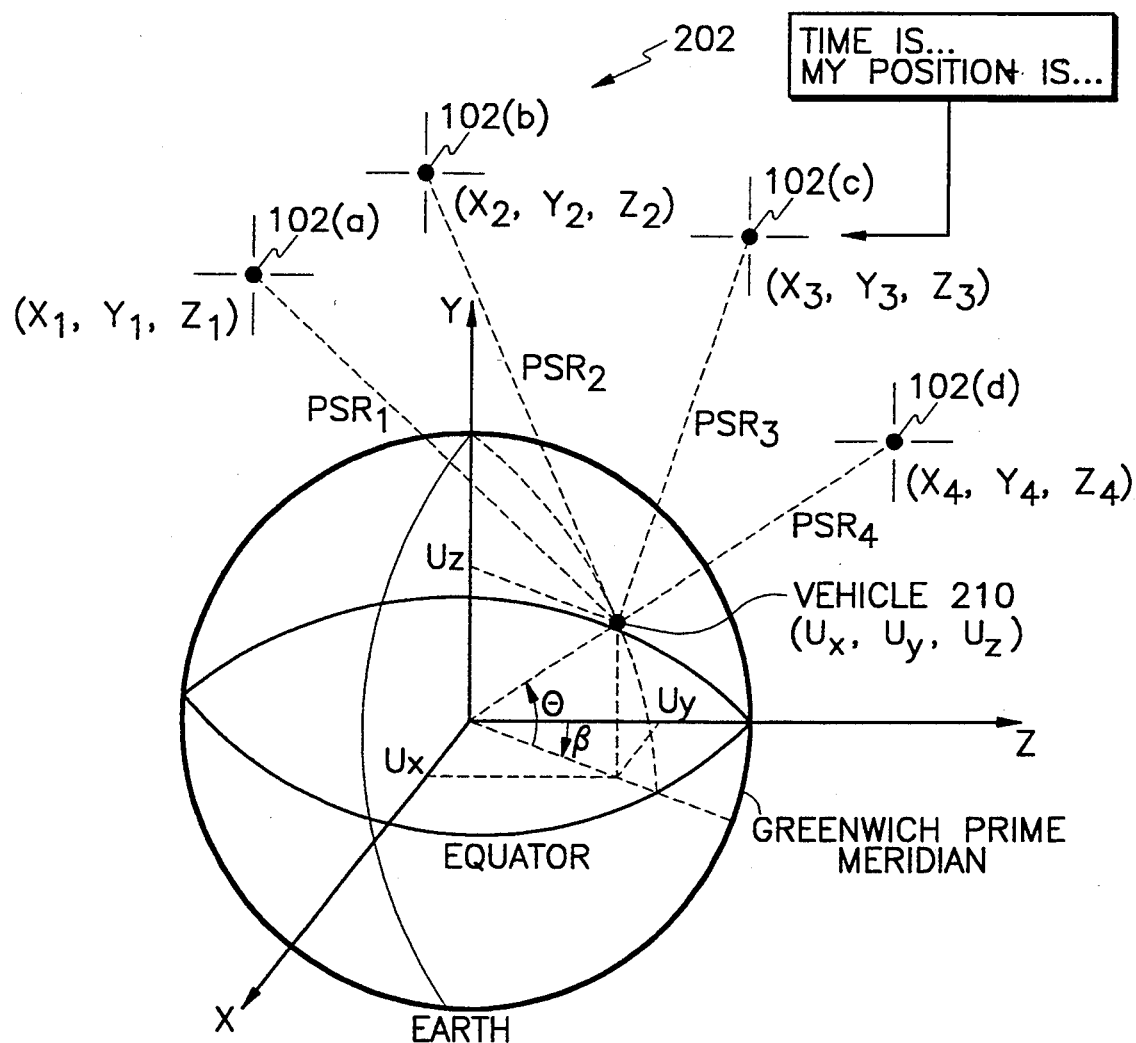
FIG. 5 is a diagram showing the geometric relationship between the center of the Earth, a vehicle near the surface of the Earth and a constellation of GPS satellites.

FIG. 5 shows a sample satellite constellation 202, having GPS satellites 102(a)–102(d), in view of vehicle 210. In Cartesian coordinates, with respect to the center of the Earth, satellite 102(a) is located at $(x_1,y_1,z_1)$; satellite 102(b) is located at $(x_2,y_2,z_2)$; satellite 102(c) is located at $(x_3,y_3,z_3)$; satellite 102(d) is located at $(x_4,y_4,z_4)$; and vehicle 210 is located at a position $(U_x,U_y,U_z)$.

The Cartesian (x,y,z) coordinates of each satellite 102 are determined by GPS receiver 406 using a satellite's ephemeris data. The pseudoranges ($PSR_1$, $PSR_2$, $PSR_3$ and $PSR_4$) between vehicle 210 and each satellite are determined by GPS receiver 406 using transmission time delays. Given this information for at least four satellites, the location of vehicle 210 (i.e., receiver 406) may be determined using the following four distance equations:

$$(x_1-U_x)^2+(y_1-U_y)^2+(z_1-U_z)^2=(PSR_1-B_{clock})^2 \quad \text{EQ. 1}$$

$$(x_2-U_x)^2+(y_2-U_y)^2+(z_2-U_z)^2=(PSR_2-B_{clock})^2 \quad \text{EQ. 2}$$

$$(x_3-U_x)^2+(y_3-U_y)^2+(z_3-U_z)^2=(PSR_3-B_{clock})^2 \quad \text{EQ. 3}$$

$$(x_4-U_x)^2+(y_4-U_y)^2+(z_4-U_z)^2=(PSR_4-B_{clock})^2 \quad \text{EQ. 4}$$

where:

$B_{clock}$=clock bias The "clock bias" is a zero order correction factor which attempts to compensate for the clock error discussed above.

Note that there are four unknowns in these equations: $U_x$, $U_y$, $U_z$, and $B_{clock}$. Note also that each satellite produces an equation. Thus, we have four satellites and four unknowns, allowing the equations to be solved for the clock bias ($B_{clock}$) and the position ($U_x,U_y,U_z$) of Vehicle 210.

If the clock bias ($B_{clock}$) is eliminated, then only three variables remain in the equation such that only three satellites are necessary to solve for the position of vehicle 210. The clock bias can be eliminated if a high precision clock (e.g., an atomic clock) is used in receiver system 400.

If the latitude (L) and longitude (λ) of the vehicle are desired, they can be computed using the following equations:

$$\text{Latitude} \approx \cos^{-1}\sqrt{\frac{U_x^2+U_y^2}{U_x^2+U_y^2+U_z^2}} \quad \text{EQ. 5}$$

$$\text{Longitude} = \tan^{-1}\frac{U_y}{U_x} \quad \text{EQ. 6}$$

Note that this latitude equation provides an approximate latitude. Determination of a more exact latitude requires that a complex iterative process be used.

GPS Processing System 312 and Kalman Filtering

From a user's perspective, GPS processing system 312 is the most important part of the autonomous vehicle system 200. GPS processing system 312 is responsible for receiving the signals from each GPS satellite, for selecting the optimal satellites for processing, for determining the precise position of each selected satellite, for determining the pseudorange to each satellite, and ultimately for estimating the position of the receiver based on the satellite positions and the pseudoranges. All of this must be done using received data (of greatly attenuated amplitudes) which is most often heavily corrupted with noise (including noise produced by the atmosphere, the preamplifier and the receiver). GPS processing system 312 relies extensively on Kalman Filtering to eliminate the noise from the GPS navigation signals. Kalman filtering is performed in GPS processor 408.

The Kalman filter is a recursive least-squares algorithm which is normally implemented via software or firmware on a digital computer (processor 408). In the preferred embodiment, the Kalman filter assumes that the noisy signals are discrete rather than continuous in nature. Both the data and noise are modeled in vector form, and the data is processed recursively.

A Kalman filter performs two functions. First, it extrapolates a data estimate from previous data. Second, it updates and refines the extrapolated data estimate based on current data. For example, if a vehicle position $p_1$ and velocity $v_1$ are known at time $t_1$, then the filter (performing the extrapolation step) will use $p_1$ and $v_1$ to estimate a position $p_2$ at a time $t_2$. Thereafter (performing the update step), newly acquired data at time $t_2$ is used to refine the position estimate $p_2$. Data which is fed to the Kalman filter to aid in either the extrapolation or the update/refinement steps is said to "constrain" the filter.

Kalman filtering is well known in the art. For a more detailed discussion on Kalman filtering, see Brown, R. G., "Kalman Filtering: A Guided Tour," Iowa State University; and Kao, Min H. and Eller, Donald H., "Multiconfiguration Kalman Filter Design for High-Performance GPS Navigation," *IEEE Transactions on Automatic Control*, Vol. AC-28, No. 3, March 1983, the relevant teachings of which are incorporated by reference.

Conventionally, because the Kalman filter is a linear filter, the distance equations set forth above are not solved directly, but are first linearized. That is, the equations are differentiated and the derivative of each equation is solved in order to compute a change from a last known position. For example, a first position estimate at time $t_1$ can be rapidly computed by GPS processor 410 by differentiating the navigation equations and solving for a change in position $(\Delta U_x, \Delta U_y, \Delta U_z)$ from a last known vehicle position $(U_x,U_y,U_z)_{i-1}$ at $t_{i-1}$. This greatly simplifies the solution of the distance equations.

As an alternative to Kalman filtering, least squares estimation or best fit polynomial matching may be used.

Base Station 220

GPS data from constellation 202 of 6PS satellites 102 is also received by base station 220. Base station 220 comprises a host processing system 328. Host processing system 328 is similar to GPS processing system 312 of vehicle 210 in that it contains a GPS receiver (e.g., a Magnavox model MX4818) for determining the position of the base station with respect to the center the Earth. The base station is used to make a "differential GPS system".

In a differential 6PS system, a GPS computed position of the base station is used in conjunction with the known position of the base station to compute biases. By producing a bias or correction factor for each pseudorange, the base station can quantify and correct errors present in the first position estimate.

The base station can compute biases in a variety of ways. In the preferred embodiment, the GPS computed pseudorange from each satellite is compared to a computed distance (d) between the satellite and the known position of base station 220. The difference is a "differential bias" caused by atmospheric and other errors as discussed above. The base station computes a bias for each satellite used in the position computations. These biases, when communicated to the vehicle over communication channel 225, can be used to improve the accuracy of first position estimate.

The distance (d) between a satellite at a position (x,y,z) and a base station at a position $(B_x, B_y, B_z)$ is computed using the standard distance equation:

$$(x-B_x)^2 + (y-B_y)^2 + (z-B_z)^2 = d^2 \qquad \text{EQ. 7}$$

The position (x,y,z) of the satellite is computed from the satellite's ephemeris data.

The differential GPS system assumes that vehicle 210 is located relatively close to base station 220, e.g., within 40 km, such that the atmospheric errors present at base station 220 are approximately the same as the atmospheric errors present at vehicle 210. This allows the vehicle to correct, i.e., improve the accuracy of, the vehicle's first position estimate based on information generated at the base station.

Motion Positioning System (MPS) 314

As discussed above, MPS 314 includes a vehicle odometer 316 and an inertial reference unit (IRU) 318 which track the position of the vehicle based on changes from an initial known position. The vehicle odometer 316 produces data on the distance travelled by vehicle 210. The IRU 318 comprises laser gyroscope(s) 320 and accelerometer(s) 322 which can be used to produce position, velocity, roll, pitch and yaw dam. MPS 314 provides the IRU data and the odometer data to VPS processing system 324. An MPS inter-communications processor 326 controls the format of the MPS data which is provided to VPS processing system 324. From this dam, VPS processing systems 324 produces a second position estimate for vehicle 210.

VPS Processing System 324

As mentioned above, the first position estimate (FPE) from GPS may be used as an independent indication of the position of vehicle 210. Similarly, the second position estimate (SPE) computed from MPS data may be used as an independent indication of the position of vehicle 210. In the preferred embodiment, however, the first and second position estimates are combined by VPS processing system 324 to produce a more accurate third or best position estimate (BPE). To accomplish this, VPS processing system relies on Kalman filtering and on weighted averaging to optimally combine the data from GPS processing system 312 with the data from MPS 314

While the best position estimate is a-fairly accurate estimate of vehicle position, it is not perfect. As discussed above, the first position estimate (which is the key data involved in determining the position of a vehicle) includes non-linear errors which are not corrected for by the differential system. A major contributor of these non-linear errors is receiver noise.

"Receiver noise" is the noise (distortion) introduced into the FPE by receiver system 400, i.e., antenna 402, preamplifier 404 and receiver 406. This noise is random electrical noise which has a zero mean value. The noise reduces the accuracy of the system by corrupting the pseudorange computations.

A majority of receiver noise is contributed by antenna 402. Antenna noise includes localized effects such as reflections. Low noise preamplifiers and receivers are available to reduce the noise from those components, but it is difficult to eliminate antenna noise. The present invention, however, substantially reduces the effects of the noise from all of these sources.

Because the receiver noise is random with a zero mean value, the inventors have discovered that its magnitude may be reduced by averaging the GPS navigation signals from a plurality of receiver systems. The greater the number of receiver systems used, the greater the reduction in noise will be. For example, an infinite number of receiver systems would theoretically result in total elimination of the receiver noise. For a derailed explanation of the theory upon which the invention is based, see Arthur Gelb, et al. (Technical Staff of the Analytic Sciences Corporation, Reading, Mass.), *Applied Optimal Estimation*, MIT Press, 1986, pp. 5-6, which is incorporated herein by reference.

By "averaging", it is meant both normal averaging (i.e., finding a mean) as well as "weighted averaging" wherein different weights may be given to the data signals being averaged. An example of a situation in which it would be advantageous to weight the data from one receiver greater than the data from another would be if a first receiver is inherently less noisy than a second receiver (e.g., the first receiver has a more precise clock). Another example would be if one antenna is placed in a position less likely to encounter interference (e.g., shading and reflections) than another antenna.

Figure 6A:
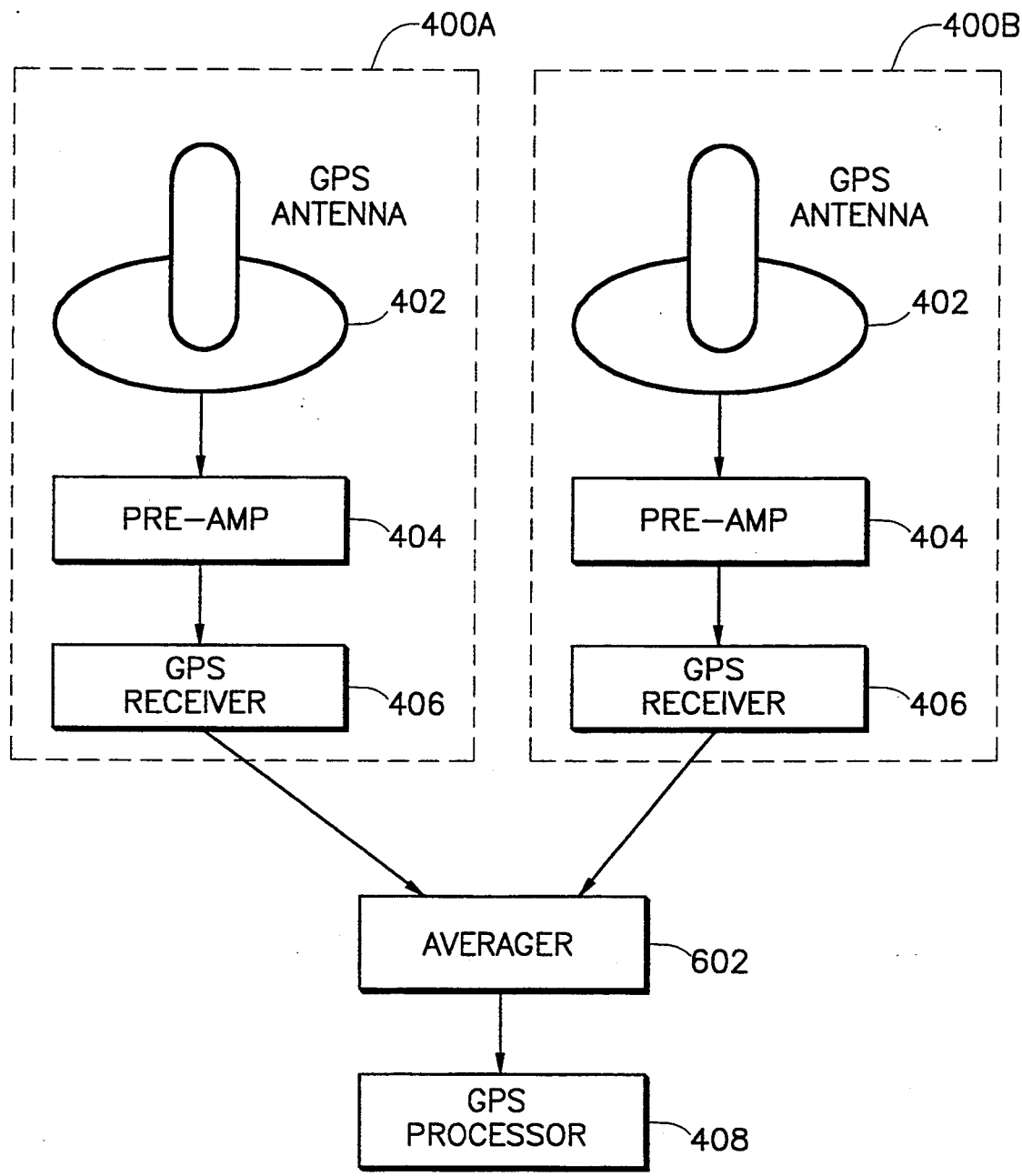
FIG. 6A is a block diagram of the GPS processing system of the invention.

The present invention provides a GPS processing system 600 which includes a plurality of receiver systems 400. This is illustrated in FIG. 6A. GPS processing system 600 replaces GPS processing system 312. GPS processing system 600 includes a first receiver system 400A, a second receiver system 400B, a signal averager 602, and a GPS processor 408. Each receiver system 400 and GPS processor 408 are identical to that of GPS processing system 312.

Signal averager 602 receives a pseudorange from each of receiver systems 400 and computes an optimal pseudorange for each satellite. The optimal pseudoranges and the satellite positions from a plurality of satellites are then provided to GPS processor 408 for computation of an FPE for vehicle 210. Signal averager 602 may be an integral part of GPS processor 408. That is, the function of computing the optimal value of the pseudoranges from receiver systems 400 may be performed by processor 408.

Figure 6B:
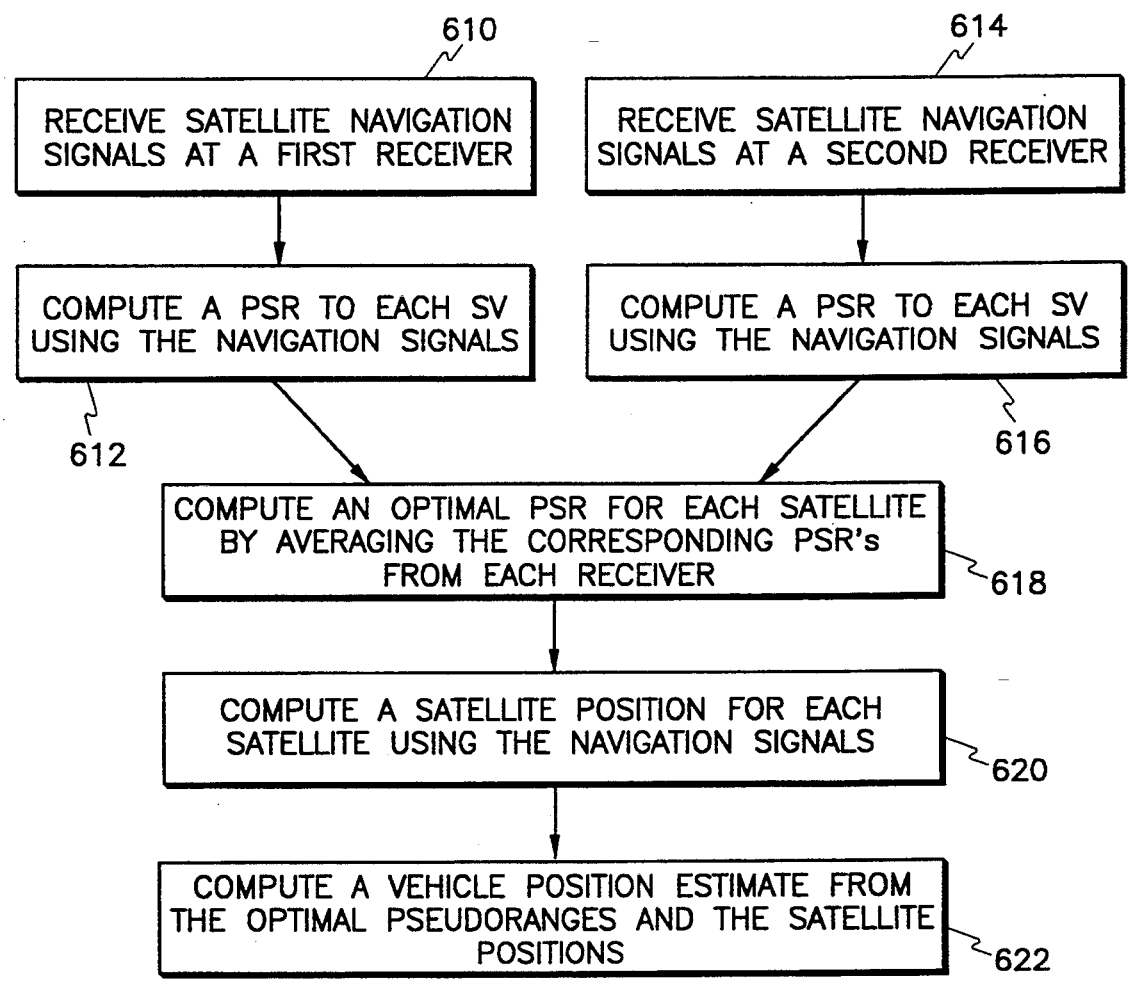
FIG. 6B is a flow chart illustrating operation of the present invention.

Operation of GPS processing system 600 is illustrated in FIG. 6B. At a step 610, navigation signals are received from each satellite in the constellation at first receiver system 400A. At a step 612, these navigation signals are used to compute a pseudorange and a satellite position for each satellite. Concurrently with steps 610,612 being performed at first receiver system 400A, identical steps are performed at second receiver system 400B. That is, navigation signals are received from each satellite in the constellation at second receiver system 400B in a step 614. These navigation signals are used to compute a pseudorange and a satellite position for each satellite at a step 616.

At a step 618, an optimal pseudorange is computed for each satellite by averaging the corresponding pseudoranges from receiver systems 400A,400B. A position for each satellite is computed at a step 620. Finally, in a step 622, a precise vehicle position is computed using the optimal pseudoranges and satellite positions from steps 618,620.

GPS processing system 600 is shown with two receiver systems 400 for illustration purposes. However, any number of receiver systems 400 may be used. As stated above, the more receiver systems used, the greater will be the reduction in noise. Of course, the desire to reduce noise and provide a more accurate FPE must be balanced with the cost involved in providing additional receiver systems on a vehicle.

It is anticipated that a two receiver system, such as that depicted in FIG. 6A, will yield a reduction in receiver noise of approximately fifty percent as compared with an identical single receiver system (assuming approximately equal noise magnitudes for each receiver).

Another advantage of the invention is that the clock bias error will also be reduced. Just as averaging reduces receiver noise, it will also reduce the clock bias error.

Figure 7:
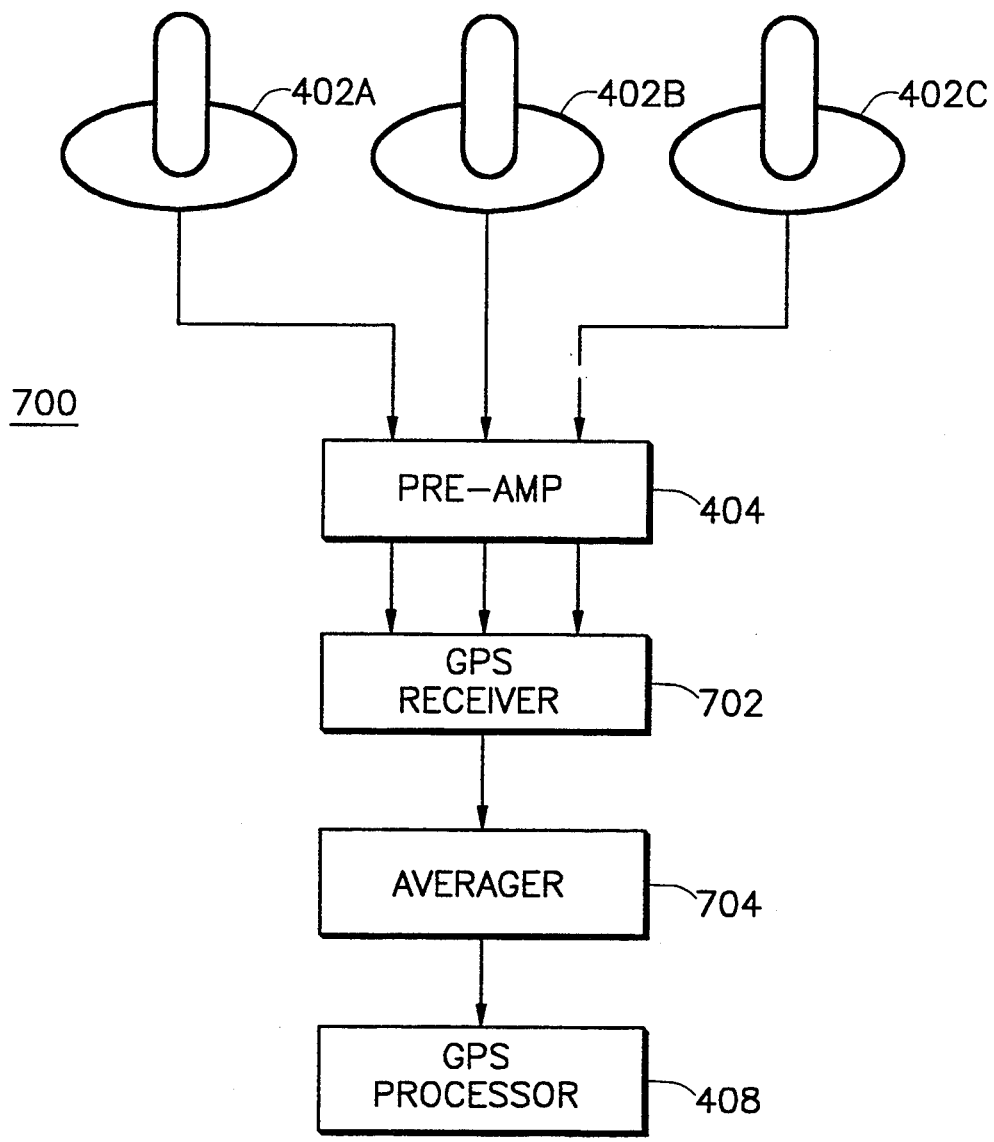
FIG. 7 is a block diagram of an alternate embodiment of the GPS processing system of the invention.

An alternate embodiment of the invention is shown in FIG. 7. In this embodiment, a plurality (three are shown for illustration purposes) of antennas 402 are used with a single GPS receiver 702. A preamplifier 404 amplifies the navigation signals received by antennas 402. GPS receiver 702 computes a satellite position for each satellite and a pseudorange for each antenna. The pseudoranges from each antenna are then averaged together by signal averager 704 to compute an optimal pseudorange.

In order for GPS receiver 702 to compute pseudoranges for a plurality of antennas 402, GPS receiver 702 must have one channel for each antenna 402 and must be capable of very fast processing. In addition, signal averager 704 must be able to store successive pseudoranges as they are output by the receiver. An optimal pseudorange cannot be computed until a pseudorange from each antenna is received by averager 704.

This alternate embodiment of the invention will be effective in reducing antenna noise only. For a reduction in noise from preamplifier 404 and receiver 702, low-noise components may be employed.

The invention has further utility for reducing the error in pseudoranges caused by localized reflections. Because a reflected signal has taken an unknown path between the transmitting satellite and the receiver system, it will result in computation of an erroneous pseudorange. If the reflection is localized (i.e., does not effect all receiver systems), however, its effects may be reduced by a factor of x, where x is proportional to the number of antennas affected by the reflection divided by the total number of antennas used by averagers 602 or 704 to compute an optimal pseudorange.

Figure 8:
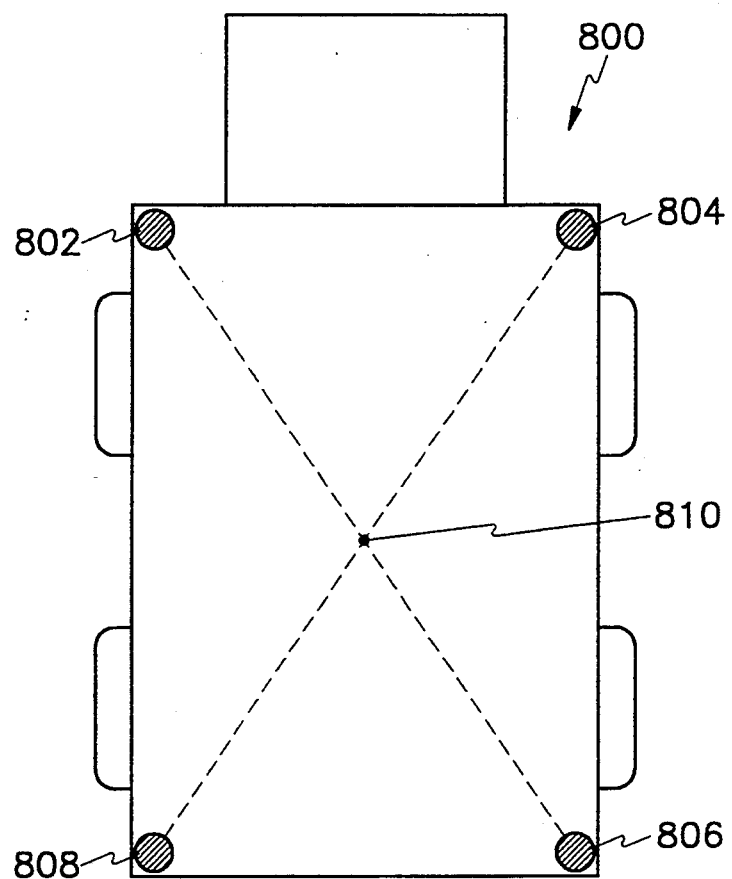
FIG. 8 is a diagram illustrating strategic placement of a plurality of antennas on a vehicle.

Antennas 402 from either of the embodiments discussed above may be strategically positioned on a vehicle. This will allow an optimal vehicle position to be computed. For example, FIG. 8 shows a vehicle 800 which has four antennas 402 or four receiver systems 400 strategically placed at the four corners 802, 804, 806 and 808 of the vehicle about a centroid 810. By finding an optimal pseudorange for these four receivers, the FPE can be accurately computed for the centroid 810 of the vehicle.

If weighted averaging (rather than straight averaging) is used to combine the pseudoranges from a plurality of receivers, a variety of methods may be used to determine the weighting factors. For example, the weighting factors can be computed from a ratio of the estimated mean noises for the receivers. As another example, the weighting factors may be computed as follows. Given a plurality of receivers (e.g., four), a mean pseudorange could be computed from a straight average of the pseudoranges from each receiver. The individual pseudoranges could then be compared to the mean pseudorange; the closer an individual value is to the mean, the higher the weighing factor assigned to it. To optimize this method, the antennas should be strategically positioned on a vehicle to minimize simultaneous errors in all of the antennas (i.e., to reduce the number of antennas that will be noisy simultaneously because of a local noise source, reflection or shading).

Another application for the invention is for determining an accurate heading of a vehicle. A known method for determining the heading of a vehicle is to compute the position of a receiver at a time $t_1$ and at a second time $t_2$. These two points define a line which is indicative of the direction in which the vehicle is travelling. By computing the positions of two antennas 402 or receiver systems 400 mounted on a vehicle, the heading of the vehicle can be determined with a single time sample. This method of determining heading presumes that the receivers are relatively noise-free.

While the invention has been particularly shown and described with reference to a preferred embodiment thereof, it will be understood by those skilled in the art that various changes in form and details may be made therein without departing from the spirit and scope of the invention as defined in the appended claims.

What is claimed is:

1. An apparatus for determining the position of a vehicle at or near the surface of the Earth using navigation signals from a satellite-based navigation system having a plurality of navigation satellites, the apparatus comprising:

first means mounted on the vehicle for receiving the navigation signals from the plurality of satellites and for computing, from the navigation signals, a first pseudorange for each of the plurality of satellites, each said first pseudorange representing the distance between said first means and a corresponding one of the plurality of satellites;

second means mounted on the vehicle for receiving the navigation signals from the plurality of satellites and for computing a second pseudorange for each of the plurality of satellites from the navigation signals, each said second pseudorange representing the distance between said second means and a corresponding one of the plurality of satellites;

third means for receiving said first and second pseudoranges and for computing, for each one of the plurality of satellites, an optimal pseudorange;

fourth means for computing a satellite position for each of the plurality of satellites from the navigation signals received by said first means; and fifth means for computing the position of the vehicle from said satellite positions and said optimal pseudoranges.

2. The apparatus of claim 1, wherein said third means comprises means for averaging said first and second pseudoranges to compute said optimal pseudorange.

3. An apparatus for determining the position of a vehicle at or near the surface of the Earth using navigation signals from a Global Positioning System which includes a plurality of satellites orbiting the Earth, the apparatus comprising:

first means mounted on the vehicle for receiving the, navigation signals from the plurality of satellites;

second means mounted on the vehicle for receiving the navigation signals from the plurality of satellites;

third means, electrically connected to said first and second means, for computing a satellite position for each satellite based on the navigation signals received by said first and second means, a first pseudorange from the navigation signals received by said first means, and a second pseudorange based on the navigation signals received by said second means;

fourth means for receiving said first and second pseudoranges and for computing an optimal pseudorange for each satellite; and fifth means for computing the position of the vehicle from said satellite positions and said optimal pseudoranges.

4. The apparatus of claim 3, wherein said fourth means comprises means for averaging said first and second pseudoranges to compute said optimal pseudorange.

5. A method for determining the position of a vehicle at or near the surface of the Earth using navigation signals from a satellite-based navigation system having a plurality of satellites, the method comprising the steps of:

(a) receiving the navigation signals from each of the plurality of satellites at a plurality of antennas mounted on the vehicle;

(b) computing from the navigation signals, for each antenna, a pseudorange to each satellite;

(c) computing an optimal pseudorange for each satellite by averaging said pseudoranges across said plurality of antennas;

(d) computing a satellite position for each of the plurality of satellites from the navigation signals; and (e) determining the position of the vehicle from said satellite positions and said optimal pseudoranges.

6. The method of claim 5, wherein step (b) of computing is performed using a plurality of receivers, each of said plurality of receivers being connected to a corresponding one of said plurality of antennas.

7. The method of claim 5, wherein step (b) of computing is performed using a single receiver connected to each of said plurality of antennas.

* * * * *